(12) United States Patent  
Shah

(10) Patent No.: US 9,323,562 B2  
(45) Date of Patent: Apr. 26, 2016

(54) PROVIDING SEAMLESS COPY-PASTE OPERATIONS IN A VIRTUAL MACHINE ENVIRONMENT

(75) Inventor: Amit Shah, Pune (IN)

(73) Assignee: Red Hat, Inc., Raleigh, NC (US)

( * ) Notice: Subject to any disclaimer, the term of this patent is extended or adjusted under 35 U.S.C. 154(b) by 544 days.

(21) Appl. No.: 13/011,718

(22) Filed: Jan. 21, 2011

(65) Prior Publication Data

US 2012/0192176 A1  Jul. 26, 2012

(51) Int. Cl.
*G06F 9/455* (2006.01)
*G06F 9/44* (2006.01)
*G06F 9/54* (2006.01)

(52) U.S. Cl.
CPC .......... *G06F 9/45558* (2013.01); *G06F 9/4445* (2013.01); *G06F 9/543* (2013.01)

(58) Field of Classification Search
None
See application file for complete search history.

(56) References Cited

U.S. PATENT DOCUMENTS 7,917,711 B2* 3/2011 Blea et al. ................... 711/162
2009/0328033 A1* 12/2009 Kohavi et al. ................ 718/1

* cited by examiner

*Primary Examiner* — Mengyao Zhe
(74) *Attorney, Agent, or Firm* — Lowenstein Sandler LLP

(57) ABSTRACT

A hypervisor running on a host computer system receives data that was requested to be copied on a client device using one of a plurality of copy operations supported by the client device. The hypervisor transfers the data and an identifier of a copy operation used on the client device to a virtual machine hosted by the host computer system to allow a user to paste the data in the virtual machine via a paste operation that corresponds to the copy operation used on the client device.

21 Claims, 9 Drawing Sheets

PROVIDING SEAMLESS COPY-PASTE OPERATIONS IN A VIRTUAL MACHINE ENVIRONMENT

TECHNICAL FIELD

Embodiments of the present invention relate generally to virtual machines. More particularly, embodiments relate to providing seamless copy-paste operations in a virtual machine environment.

BACKGROUND

Generally, the concept of virtualization in information processing systems allows multiple instances of one or more operating systems to run on a single system, even though each operating system (OS) is designed to have complete, direct control over the system and its resources. Virtualization is typically implemented by using software (e.g., a virtual machine monitor, or a "VMM") to present to each OS a "virtual machine" ("VM") having virtual resources, including one or more virtual processors, that the OS may completely and directly control, while the VMM maintains a system environment for implementing virtualization policies such as sharing and/or allocating the physical resources among the VMs (the "virtualization environment").

The virtualization technologies have wide applications in the computer field with the development of computer systems. For example, such virtualization technologies can be used to implement a virtual desktop application which runs within a virtual machine of a host and accessed from a client over a network, such as, for example, Red Hat® Enterprise Virtualization for Desktops, a product of Red Hat, Inc. of Raleigh, N.C.

A user accessing a virtual machine (also referred to as "guest") remotely from a client may want to copy data displayed in a client application and paste this data in a virtual machine application, and vice versa. Depending on the operating system of the client, various options may be available to the user for performing copy-paste operations. For example, the X server on a Linux® desktop, used for graphical display, provides 3 options for copy-paste commands: PRIMARY, SECONDARY and CLIPBOARD.

According to the PRIMARY option, any text selected using the mouse pointer or using shift and arrow keys on the keyboard is placed in the PRIMARY buffer; and when a "middle-click" using the mouse is performed using the middle mouse button or using the middle button emulation (by pressing left and right buttons at the same time), the PRIMARY buffer is queried. Alternatively, the X server may not store the selected text (referred to as "clipboard data") but rather keep a note of which X client has the active PRIMARY data. When a middle-click is performed, the X server may query the X client with the most recent clipboard data. If there is the X client with the most recent clipboard data, this data is pasted in the window where the cursor was positioned when the middle-click was performed. Otherwise, nothing may be pasted (e.g., if the application in which the data was copied has been closed). The SECONDARY option is only accessed programmatically.

According to the CLIPBOARD option, when some data is selected and then copied using a copy item from the menu (either the toolbar or right-click menu or from a menu item like 'Edit→Copy', or other keyboard shortcuts like Ctrl+C, Ctrl+V or Shift+Insert, Shift+Delete, etc) or using a 'cut' operation (Ctrl+X or selecting 'cut' from a menu item) or a 'drag and drop' operation, the data is placed in the CLIPBOARD buffer. Subsequently, when a paste item is selected from the menu or a 'paste' or 'drop' operation is performed, the data from the CLIPBOARD buffer is pasted at the current location of the cursor. Alternatively, the X server may not store the data in the CLIPBOARD buffer but rather keep a note of which X client has the active CLIPBOARD data. When a paste operation is performed (a paste item is selected from the menu or a 'paste' or 'drop' operation is performed), the X server may query the X client with the most recent clipboard data and use this clipboard data for the paste operation.

A guest operating system may support the same or different options for copy and paste operations as compared to the client operating system. A user is likely to expect the copy and paste operations to work in a virtual machine environment in the same manner as they do in a non-virtualized environment.

BRIEF DESCRIPTION OF THE DRAWINGS

The present invention is illustrated by way of example and not limitation in the figures of the accompanying drawings in which like references indicate similar elements.

DETAILED DESCRIPTION

Techniques for providing seamless copy-paste operations in a virtual machine environment are described herein. In the following description, numerous details are set forth to provide a more thorough explanation of the embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

In one embodiment, a hypervisor running on a host receives data from a client coupled to the host via a network or locally. The received data represents content that was requested by a user to be copied on the client using one of multiple copy operations supported by the client. The hypervisor transfers this data and an identifier of the copy operation to at least one virtual machine running on the host. In one embodiment, the hypervisor transfers the data and the identifier of the copy operation to all the virtual machines which have a session open on the client. For example, a user on the client may be working on three different guests at the same time. The virtual machine may maintain different buffers for various types of copy and paste operations. Based on the received identifier of the copy operation, the virtual machine identifies a corresponding buffer and copies the received data to this buffer. Upon detecting a user request to paste the data on the virtual machine, the virtual machine pastes the data from the corresponding buffer into an application running on the virtual machine.

Accordingly, copy and paste operations are made available seamlessly between a client and a virtual machine (also referred to herein as a "guest"). As a result, a user is able to copy and paste data in a virtualized environment using the same operations that he or she normally uses in a non-virtualized computing environment.

Figure 1:
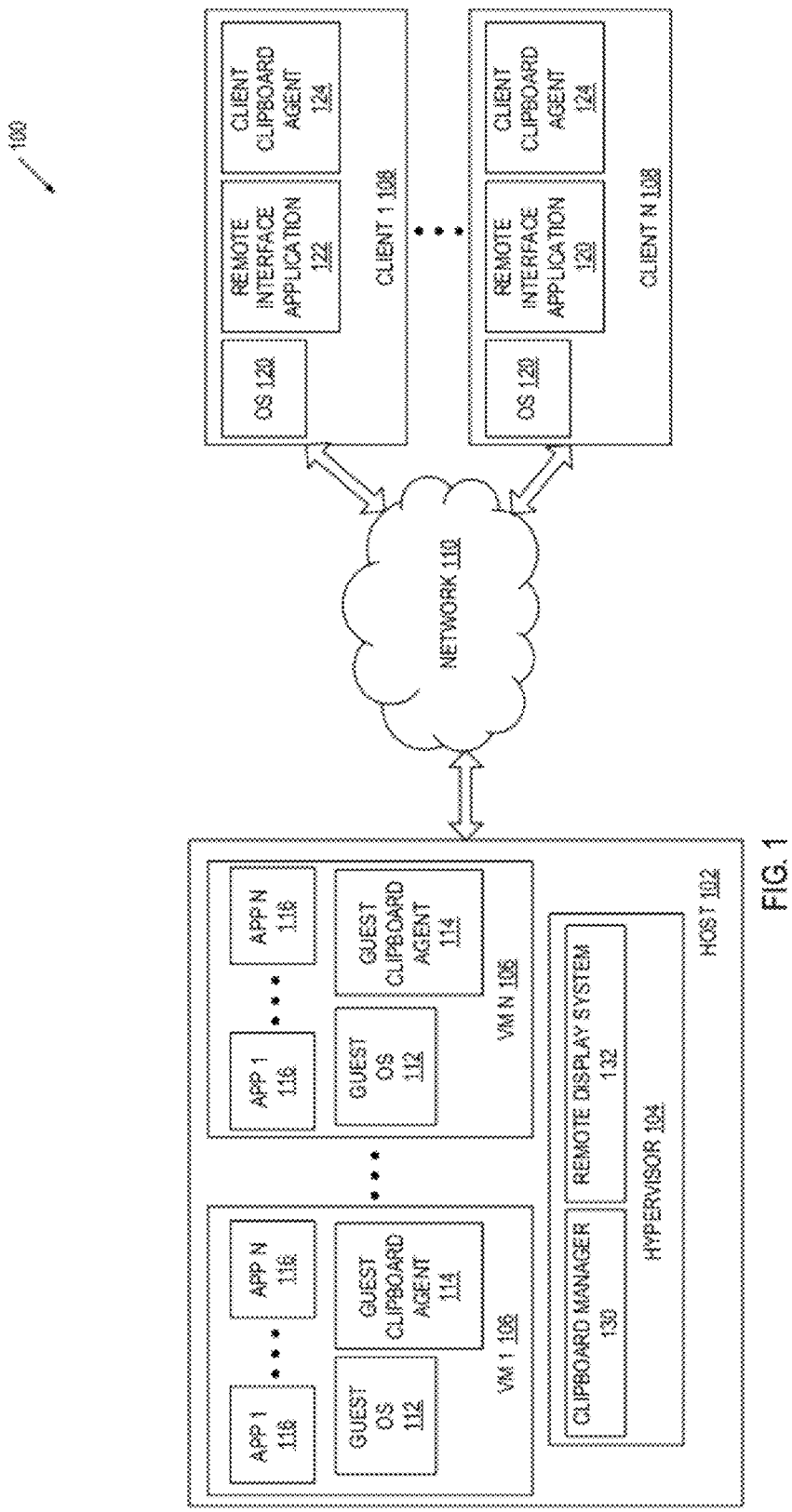
FIG. 1 is a block diagram illustrating an example of a network configuration according to one embodiment of the invention.

FIG. 1 is a block diagram illustrating an example of a network configuration 100 according to one embodiment of the invention. Network configuration 100 includes, but is not limited to, clients 108 communicatively coupled to a host machine or machines 102 via a network 110. Network 110 may be a private network (e.g., a local area network (LAN) or a wide area network (WAN)), a public network (e.g., the Internet), or a combination of one or more networks.

Each host machine 102 is a computing device configured to host virtual machines. The host machine 102 may be a personal computer (PC), server computer, mainframe, or other computing system. The host machine 102 has a bare platform hardware that can include a processor, memory, input/output devices, etc. The host machine 102 may be a single machine or multiple host machines arranged in a cluster. Host machine 102 includes a hypervisor 104 (also known as a virtual machine monitor (VMM)). The hypervisor 104, though typically implemented in software, may emulate and export a bare machine interface to higher level software. Such higher level software may comprise a standard or real-time operating system (OS), may be a highly stripped down operating environment with limited operating system functionality, may not include traditional OS facilities, etc. In one embodiment, the hypervisor 104 is run directly on bare platform hardware. In another embodiment, the hypervisor 104 is run on top of a host OS. Alternatively, for example, the hypervisor 104 may be run within, or on top of, another hypervisor. Hypervisors 104 may be implemented, for example, in hardware, software, firmware or by a combination of various techniques. The hypervisor 104 presents to other software (i.e., "guest" software) the abstraction of one or more virtual machines (VMs) 106, which may provide the same or different abstractions to various guest software (e.g., guest operating system, guest applications, etc.).

A virtual machine (also referred to herein as a guest) 106 is a combination of guest software that uses an underlying emulation of a hardware machine (e.g., as provided by a hypervisor). The guest software may include a guest operating system, guest applications, guest device drivers, etc. Virtual machines 106 can be, for example, hardware emulation, full virtualization, para-virtualization, and operating system-level virtualization virtual machines. Each virtual machine 106 includes a guest operating system (guest OS) that hosts one or more applications within the virtual machine. The guest OSes running on the virtual machines 106 can be of the same or different types (e.g., all may be Windows® operating systems, or some may be Windows operating systems and the others may be Linux® operating systems). Moreover, the guest OSes and the host OS may share the same operating system type, or the host OS may be a different type of OS than one or more guest OSes. For example, a guest OS may be a Windows operating system from Microsoft® and a host OS may be a Linux operating system available from Red Hat. In some embodiments, an operating system capable of running on bare-metal hardware is capable of running as a guest OS and/or software capable of running on bare hardware is capable of running within a virtual machine.

Each client 108 may be a personal computer (PC), palm-sized computing device, personal digital assistant (PDA), etc. Clients 108 may be fat clients (clients that perform local processing and data storage), thin clients (clients that perform minimal or no local processing and minimal to no data storage), and/or hybrid clients (clients that perform local processing but little to no data storage). In one embodiment, clients 108 essentially act as input/output devices, in which a user can view a desktop environment provided by a virtual machine 106 (e.g., a virtual desktop) on a monitor, and interact with the desktop environment via a keyboard, mouse, microphone, etc. In one embodiment, a majority of the processing is not performed at the clients 108, and is instead performed by virtual machines 106 hosted by the host machine 102.

A virtual desktop can represent an output (e.g., an image to be displayed) generated by a desktop application running within the VM 106. Graphics data associated with the virtual desktop can be captured and transmitted to the client 108 (e.g., in the form of commands), where the virtual desktop may be rendered and presented by a remote interface application 120 of the client 108. The graphics data may include video, mouse, keyboard, 3D data, etc. The remote interface application 120 may be a thin client application such as a browser application. In one embodiment, the host 102 communicates with the remote interface application 120 using a remote access protocol (e.g., Remote Desktop Protocol (RDP), Simple Protocol for Independent Computing Environments (SPICE™ from Red Hat), Virtual Network Computing (VNC), etc.) that allows for display connection between the host 102 and the client 108.

Each VM 106 may have one or more virtual devices (not shown) that emulate physical devices such as a display card (e.g., PCI display card). For example, a virtual device may emulate graphic verbs such as drawing lines, ellipses, fill areas, display images, etc. In addition, the virtual devices may emulate 3D verbs, such as drawing cubes, rotating a shape, etc. and may also provide video streaming verbs. In some embodiments, the virtual devices use the local host hardware to accelerate some functions (e.g., local rendering).

In one embodiment, the host 102 includes a remote display system (RDS) 132 that may be part of the hypervisor 104 or a hardware emulation layer, or run on top of the hypervisor 104. The RDS 132 oversees network connections of the VM 106 and assists a remote interface application 120 on the client 108 in establishing display connections for the VM 106. In particular, in one embodiment, the remote interface application 120 establishes an initial connection with the host 102 and requests information about the available display channels that the remote interface application 120 can connect to. The remote interface application 120 then uses this information to establish display connections with the virtual device(s) of the VM 106. During the active display connection, the RDS 132 receives data (e.g., graphics commands) from the virtual device of the VM 106, and communicates this data to the remote interface application 120. The RDS 132 may use different connections for different types of data (different types of graphics commands such as video, mouse, keyboard, 3D data, etc.), where each type of data can be transmitted using a dedicated connection or a shared connection.

Clients 108 may support various options for performing copy/paste operations. For example, client 108 executing Linux operating system that uses the X Windows® system for graphical display can provide 3 options for copy and paste commands: PRIMARY, SECONDARY and CLIPBOARD. According to the PRIMARY option, any data (e.g., text, graphics, etc.) selected using the mouse pointer can be placed in the PRIMARY buffer; and when a "middle-click" using the mouse is performed, the PRIMARY buffer may be queried. If the PRIMARY buffer has any data, this data is pasted in a window where the cursor was positioned when the middle-click was performed.

The SECONDARY clipboard option may only be available programmatically, so a program can link to the X Windows libraries and indicate that there's some data available in the SECONDARY clipboard. Similarly, another program can query the SECONDARY clipboard (or get notified when the contents change) and read the data from the corresponding selection.

According to the CLIPBOARD option, when some data is selected and then copied using a copy item from the menu (or using a 'cut' operation (Ctrl+X or selecting 'cut' from a menu item) or a 'drag and drop' operation), the data is placed in the CLIPBOARD buffer. Subsequently, when a paste item is selected from the menu (or a paste or drop operation is used), the data from the CLIPBOARD buffer is pasted at the current location of the cursor.

Alternatively, rather then placing the selected data in a buffer, the state can be updated within X Windows that points to the application where the copy operation happened. In particular, the X Window system is a client-server architecture, and each application operates as a separate client that connects to the X server. For example, in case of OpenOffice.org®, two instances of the OpenOffice application displaying two different documents on the same desktop operate as two different X clients connected to the X Server. When the copy operation happens in one OpenOffice window, only the X client's buffer gets filled up and the X Server is notified. When any client then does a paste operation, the X Server is queried as to which X client holds the most recent copy data, and the data is read from that X client and sent on to the client that performed the paste operation.

A user may desire to copy some data (e.g., text, graphics, etc.) on the client 108, and then paste this data into a guest application 116, and vice versa. Embodiments of the invention enable a user to copy data on the client 108 and paste it into a guest application 116 on the virtual machine 106 (or vice versa) using a matching set of copy and paste operations. For example, if both client OS 120 and guest OS 112 utilize the X Windows system that provides 3 selections for copy and paste operations as described above, a user may be able to copy data on the client 108 using a copy operation associated with the PRIMARY selection (e.g., by selecting text with the mouse pointer), and then move focus to the guest window and paste this data into a guest application using a paste operation associated with the PRIMARY selection (e.g., by performing a "middle-click" using the mouse). Similarly, a user may be able to copy data on the guest 106 using a copy operation associated with the CLIPBOARD selection (e.g., by selecting text and activating a copy item on the menu), and then move focus to a client application window and paste this data into the client application using a paste operation associated with the CLIPBOARD selection (e.g., by activating a paste item on the menu).

It should be noted that the above examples of selections for copy and paste operations are provided for illustration only and should not be interpreted to limit embodiments of the present invention in any way. Rather, the embodiments of the present invention can be used with different operating systems that support a wide variety of selections for copy and paste operations without loss of generality.

In one embodiment, the client 108 includes a client clipboard agent 124 that detects a copy operation on the client 108 and uses the remote interface application 120 to transmit the data to be copied and an identifier of the copy operation that specifies the selection used to invoke the copy operation to the remote display system 132 on the host 102. The client clipboard agent 124 may be part of a remote interface application 120 that communicates with the remote display system 132 (e.g., as a VNC viewer and a VNC server, etc.). Alternatively, the client clipboard agent 124 may be separate from the remote interface application 120 and may pass information to the remote interface application 120 for transmission to the remote display system 132 on the host 102.

The remote display system 132 passes the clipboard information received from the remote interface application 120 to a clipboard manager 130 that communicates the clipboard information to a guest clipboard agent 114 of a corresponding VM 106 (e.g., via a clipboard channel established between the hypervisor 102 and the VM 106). The guest clipboard agent 114 saves the copied data to a respective buffer or indicates to the X Server that it has new clipboard data for the selection type indicated by the identifier. In one embodiment, the guest clipboard agent 114 listens for data on the clipboard channel, either by polling at regular intervals for new data or by getting woken up on new data written by the clipboard manager 130.

When the user performs, on the virtual machine 106 (e.g., via a client-side display program), a paste operation matching the copy operation used on the client 108, a guest application 116 is provided with the most recently received data from the hypervisor for the corresponding selection. In particular, in one embodiment that uses a central buffer to manage all copy/paste operations (e.g., the Windows guest OS), the clipboard agent 114 provides the contents of the buffer to the guest application 116 as soon as it receives the data from the hypervisor. In an alternative embodiment that does not use a central buffer (e.g., the X Windows guest OS), the guest application 116 queries the X server for the corresponding selection and receives the data from the guest clipboard agent 114 that acts as the X client.

Similarly, if the guest clipboard agent 114 detects a copy operation or is notified of a copy operation as a result of an earlier request to be notified on any clipboard copy operation on the guest 106, it passes the text to be copied and an identifier of the copy operation (which specifies the selection used for the copy operation) to the clipboard manager 130, which uses the remote display system 132 to pass this clipboard information to a remote interface application 120. The remote interface application 120 communicates this clipboard information to the client clipboard agent 124, which may save the copied data to a respective buffer or indicate to the X Server that it has new clipboard data for the selection type indicated by the identifier. When the user performs a paste operation on the client that matches the copy operation used on the virtual machine 106, the client clipboard agent 124 pastes the data saved in the buffer into a client application, or the client application queries the X server for the corresponding selection and receives the data from the client clipboard agent 124 that acts as the X client.

It should be noted that the remote display system 132 and the remote interface application 120 can transfer clipboard data using multiple channels associated with different types of copy and paste operations, or using a single channel. In addition, the host 102 may include a separate RDS 132 and/or a separate clipboard manager 130 for each virtual machine running on the host 102. Alternatively, the host 102 may include a single RDS 132 and/or a single clipboard manager 130 for all virtual machines running on the host 102.

In an alternative network configuration (not shown), the client 108 is a local client of the host 102, e.g., it is part of the host 102 and it communicates with the hypervisor 104 locally. For example, a school computer that hosts client software and a virtual machine for each student that uses this school computer.

Figure 2:
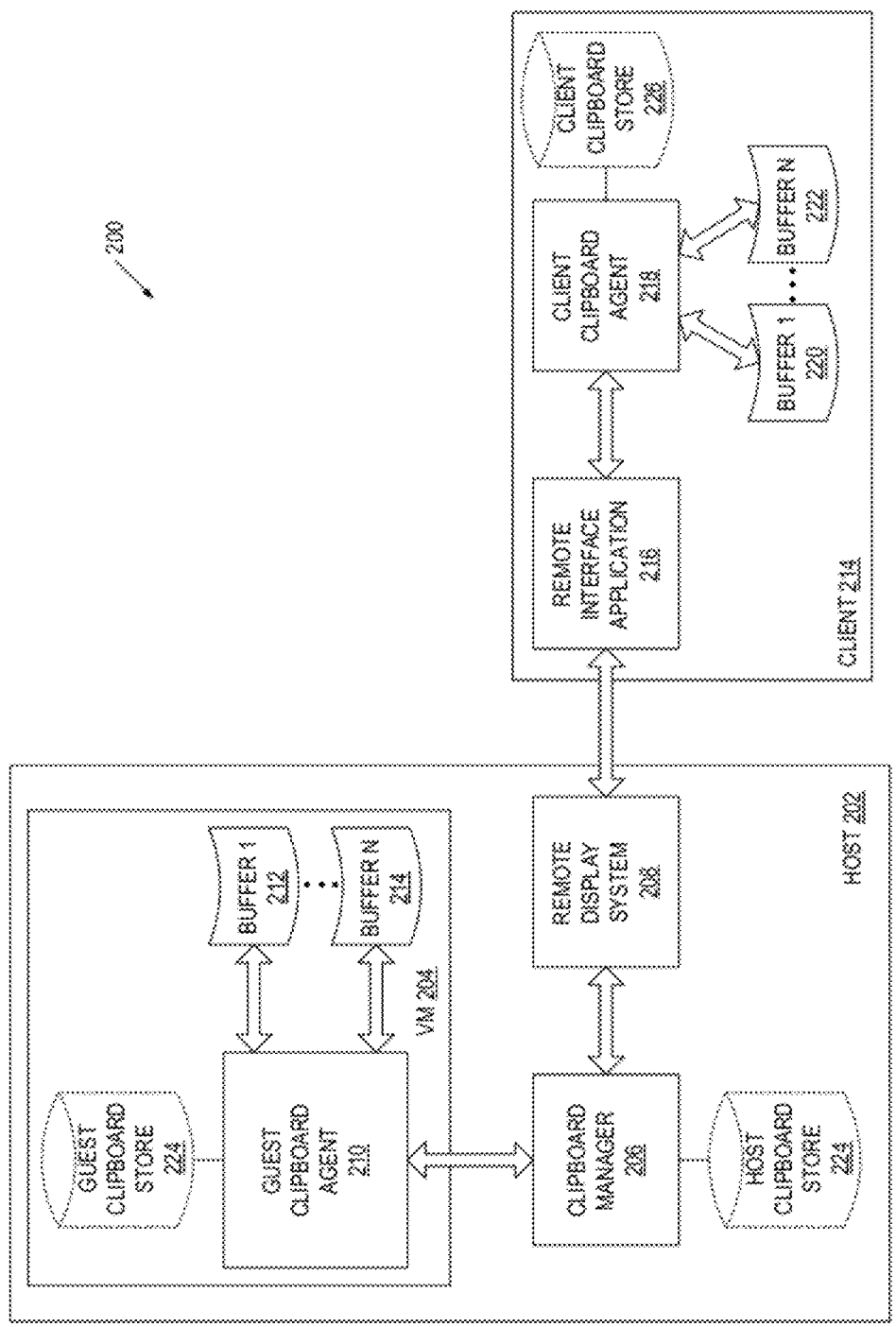
FIG. 2 is a block diagram illustrating a clipboard managing system, in accordance with one embodiment of the present invention.

FIG. 2 is a block diagram illustrating a clipboard managing system 200, in accordance with one embodiment of the present invention. For simplicity, the clipboard management system 200 is shown to include a single client 114 coupled to a host 202 that includes a single virtual machine (VM) 204.

The client 214 includes a remote interface application 216, a client clipboard agent 218 and a set of buffers 220 through 222 associated with different options for copy and paste operations. The host 202 includes a remote display system (RDS) 208 and a clipboard manager 206 that may be part of a hypervisor or run on top of the hypervisor as a separate program. A VM 204 running on the host 202 may include a guest clipboard agent 210 and a set of buffers 212 through 214 associated with different options for copy and paste operations.

As discussed above, the client clipboard agent 218 and the guest clipboard agent 210 can communicate data selected for copying via the clipboard manager 206 and save this data to a buffer associated with a user-selected option for a copy operation or indicate to the X Server that it has new clipboard data for the option selected by the user for the copy operation. When a user selects the same option for a paste operation, the data saved in the associated buffer is pasted into a guest or client application or the guest or client application queries the X server for the corresponding selection and receives the data from the guest or client clipboard agent that acts as the X client.

The set of copy and paste options provided by the VM 204 may or may not match the set of copy and paste options provided by the client 214. In one embodiment, when the VM 204 starts running, it establishes a communication channel with the clipboard manager 206 to transfer clipboard data (e.g., a clipboard channel), and sends a list of options for copy and paste operations supported by the VM 204 to the clipboard manager 206. The clipboard manager 206 saves this list to a host clipboard store 224, and sends a list of options for copy and paste operations supported by the hypervisor to the guest clipboard agent 210, which saves this list to a guest clipboard store 224.

In one embodiment, when the client 214 establishes a connection with the host 202 (e.g., via the remote interface application 216 and the remote display system 208), the client clipboard agent 218 and the clipboard manager 206 provide a list of supported copy and paste options to each other. The client clipboard agent 218 saves the list of copy and paste options supported by the hypervisor in a client clipboard store 226, and the clipboard manager 206 saves a list of copy and paste options supported by the client 214 in the host clipboard store 224. As mentioned previously, the client 214 may not exchange this data, rather it may be exchanged only between the clipboard manager 206 and the remote display system 208.

In the above embodiment, when the client clipboard agent 218 detects a copy operation on the client 214, it determines whether the hypervisor supports the copy operation selected by the user. If so, the client clipboard agent 218 uses the remote interface application 216 to transmit the data to be copied and the identifier of the user-selected copy operation to the remote display system 208. If the hypervisor does not support the copy operation selected by the user, the client clipboard agent 218 chooses a copy and paste feature from the list of options in the client clipboard store 226 (e.g., a random option or a predefined default option or an option according to the user's preference, which can be included in a user-specific configuration file that is updated via a text editor or a user interface) and uses the remote interface application 216 to transmit the data to be copied and the identifier of the copy and paste feature chosen from the client clipboard store 226 to the remote display system 208, which passes this clipboard information to the clipboard manager 206.

The clipboard manager 206 determines whether the copy operation received from the client 214 is supported by the VM 204. If so, it communicates the clipboard information to the guest clipboard agent 210. If not, the clipboard manager 206 chooses a copy and paste feature from the list of options supported by the VM 204 (e.g., a random option or a predefined default option) and communicates the resulting clipboard information to the guest clipboard agent 210. In an alternative embodiment, when the guest OS starts up, its guest clipboard agent 210 notifies the clipboard manager 206 about the clipboard selections supported by the guest OS, and the clipboard manager 206 notifies the guest clipboard agent 210 about the selections supported by the host 202 (and optionally the remote display system 208. The guest clipboard agent 210 can then make the decision to send clipboard data to the selection of its choosing (i.e., the decision-making process is shifted from the hypervisor to the guest).

The guest clipboard agent 210 identifies one of the buffers 212-214 that corresponds to the copy option received from the hypervisor and stores the copied data to this buffer, or the guest clipboard agent 210 indicates to the X Server that it has new clipboard data for the copy option selected by the user. Subsequently, when the user performs a paste operation on the VM 204 via a client-side display program, the guest clipboard agent 210 identifies one of the buffers 212-214 that corresponds to the paste operation selected by the user, and pastes the content of this buffer into a guest application or the guest application queries the X server for the corresponding selection and receives the data from the guest clipboard agent 210 that acts as the X client.

As a result, each of the guest clipboard agent 210, the clipboard manager 206 and a client clipboard manager 218 can be independently updated to support more copy and paste options or different copy and paste options without requiring any changes to the other components.

In an alternative embodiment, the client clipboard agent 218 provides the copy and paste options supported by the client 214 to the clipboard manager 206 but does not receive the copy and paste options supported by the hypervisor in return. In addition or alternatively, the guest clipboard agent 210 provides the copy and paste options supported by the VM 204 to the clipboard manager 206 but does not receive the copy and paste options supported by the hypervisor. In such embodiment(s), the clipboard manager 206 acts as an intermediary and can adjust the received clipboard data according to the options supported by the other component(s). For example, if a user copies data on the client using the PRIMARY option for a copy operation, the client clipboard agent 218 will send the copied data and identifier of the PRIMARY option to the clipboard manager 206. If the clipboard manager 206 does not recognize the PRIMARY option, it will choose a default option and send the default option to the guest clipboard agent 210 if the VM 204 supports this default option. If the clipboard manager 206 determines that the VM 204 does not support the default option, the clipboard manager 206 will choose the option that the VM 204 supports, and send this option to the guest clipboard agent 210.

Figure 3:
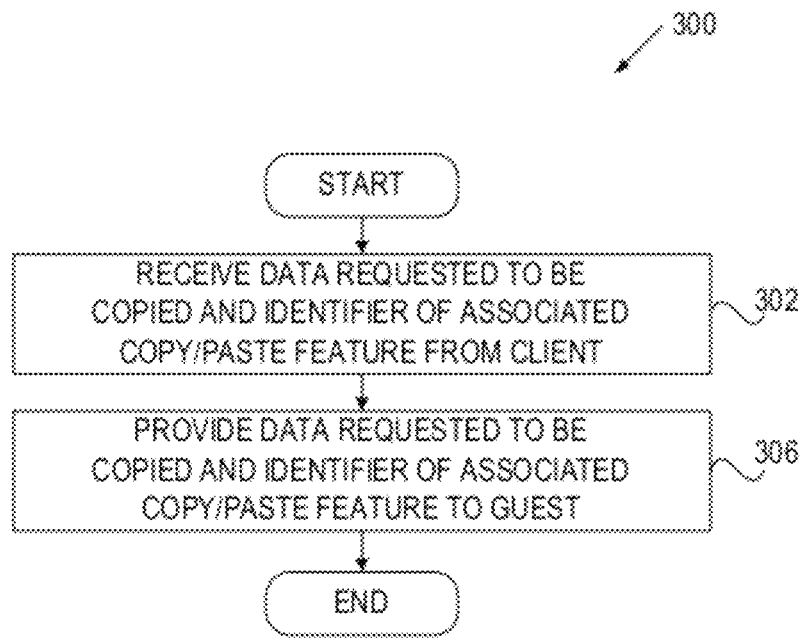
FIG. 3 is a flow diagram of one embodiment of a clipboard management method for a hypervisor.
Figure 4:
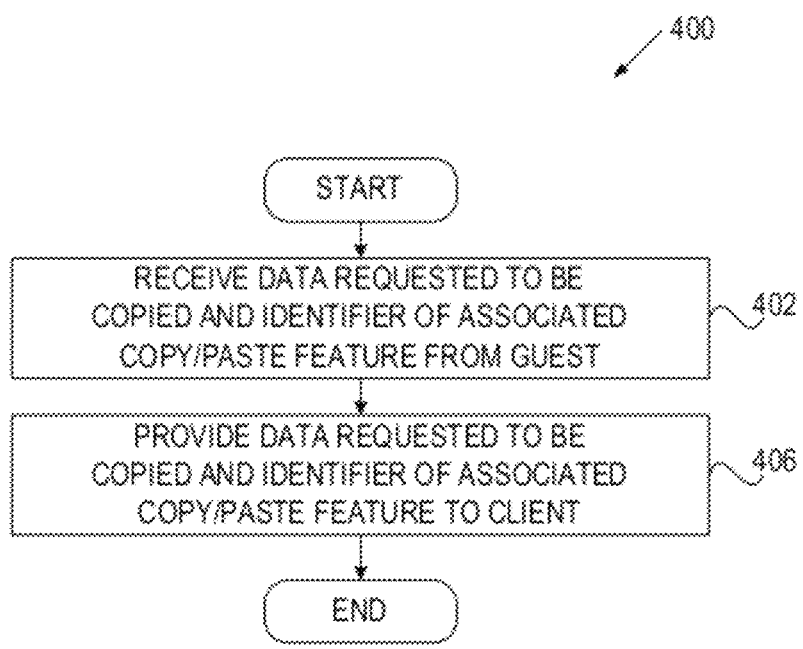
FIG. 4 is a flow diagram of another embodiment of a clipboard management method for a hypervisor.
Figure 5:
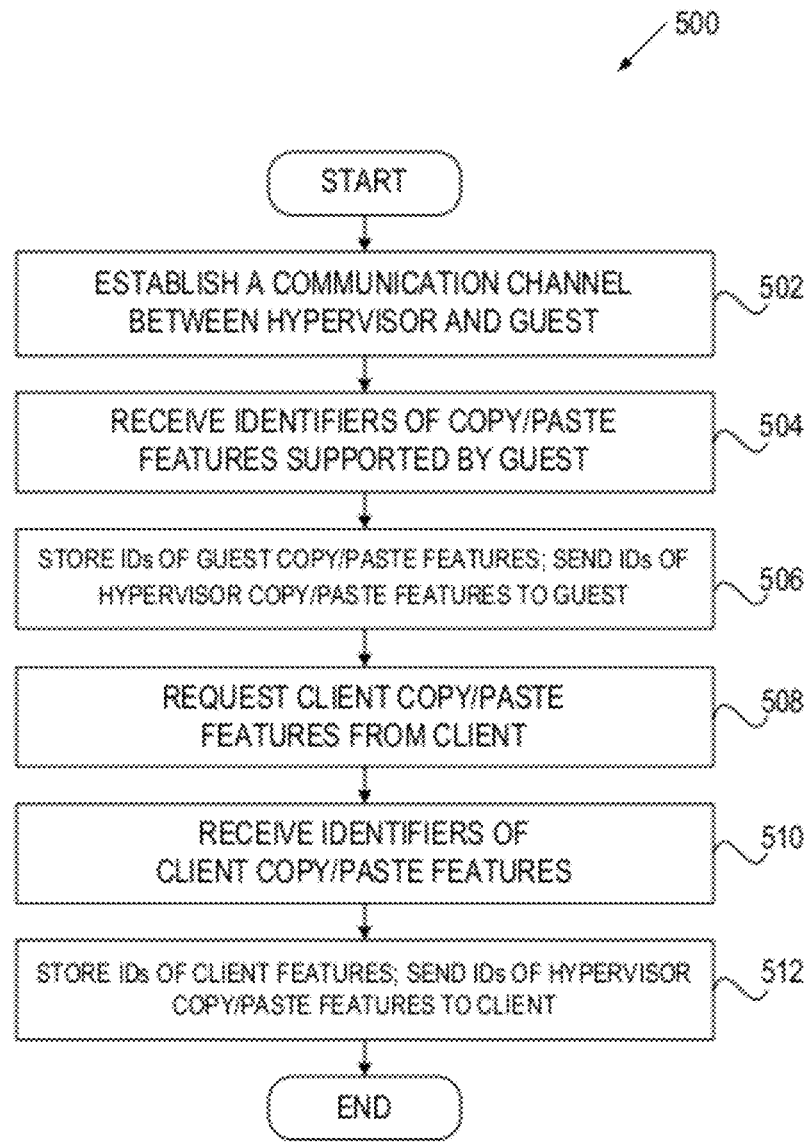
FIG. 5 is a flow diagram of one embodiment of a clipboard setup method for a hypervisor.

FIGS. 3-5 illustrate embodiments of a clipboard management method for a hypervisor. The method may be performed by processing logic that may comprise hardware (circuitry, dedicated logic, etc.), software (such as is run on a general purpose computer system or a dedicated machine), or a combination of both. In certain embodiments, the method is performed by a host machine 102, as depicted in FIG. 1. The methods may be performed by a clipboard manager (e.g., clipboard manager 130 of FIG. 1) that runs on a host machine.

Referring to FIG. 3, method 300 begins with the clipboard manager receiving data requested to be copied and an identifier of an associated copy and paste feature from the client (block 302). In one embodiment, the associated copy and paste feature is defined by a copy operation selected by the user.

At block 306, the clipboard manager provides the data requested to be copied and the identifier of the associated copy and paste feature to the guest to allow a user to paste the copied data into a guest application using a paste operation that matches the copy operation selected by the user on the client.

In one embodiment, prior to providing the clipboard data received from the client, the clipboard manager determines whether the guest supports the copy and paste feature selected by the user on the client. If so, the clipboard manager performs block 306. If not, the clipboard manager chooses a copy and paste feature supported by the guest, and sends the copied data and the identifier of this feature to the guest.

In another embodiment, if the guest does not support all of the options for copy and paste operations that are supported by the client, the clipboard manager does not provide the identifier of the copy and paste operation to the guest. In such an embodiment, any data received by the guest can be placed in a predefined buffer. For example, if the guest only supports the clipboard feature, any data received by the guest can be placed in the clipboard buffer. Yet alternatively, if the guest supports more options than the client, then the data can be saved to a matching buffer or to any or all of the buffers available, depending on a user preference or software defaults.

Referring to FIG. 4, method 400 begins with the clipboard manager receiving data requested to be copied and an identifier of an associated copy and paste feature from the guest (block 402). At block 406, the clipboard manager provides the data requested to be copied and the identifier of the associated copy and paste feature to the client to allow a user to paste the copied data into a client application using a paste operation that matches the copy operation selected by the user on the guest.

In one embodiment, prior to providing the clipboard data received from the guest, the clipboard manager determines whether the client supports the copy and paste feature selected by the user on the guest. If so, the clipboard manager performs block 406. If not, the clipboard manager chooses a copy and paste feature supported by the client guest, and sends the copied data and the identifier of this feature to the client.

In another embodiment, if the client does not support all of the options for copy and paste operations that are supported by the guest, the clipboard manager does not provide the identifier of the copy and paste operation to the client. In such an embodiment, any data received by the client can be placed in a predefined buffer. Yet alternatively, if the client supports more options than the guest, then the data can be saved to a matching buffer or to any or all of the buffers available, depending on a user preference or software defaults.

Referring to FIG. 5, method 500 begins with establishing a communication channel for clipboard data between the hypervisor (a clipboard manager that is part of the hypervisor) and the guest (block 502). At block 504, the clipboard manager receives identifiers of copy and paste features supported by the guest. At block 506, the clipboard manager stores the identifiers of copy and paste features supported by the guest in a host clipboard store, and sends identifiers of copy and paste features supported by the hypervisor to the guest.

Next, when a connection between the client and the host is established, the clipboard manager requests identifiers of copy and paste features supported by the client (block 508). Then, the clipboard manager receives the identifiers of copy and paste features supported by the client (block 510), stores them in a host clipboard store (block 512), and sends identifiers of copy and paste features supported by the hypervisor to the client.

It should be noted that it is not necessary for the clipboard manager to request copy and paste features supported by the client. Rather, the clipboard manager may have a programmatically defined list of predefined copy and paste features supported by the client or the clipboard manager may assume that the client supports all, some or none of the available copy and paste features, and act accordingly.

The embodiment illustrated in FIG. 5 allows each of a guest clipboard agent, a clipboard manager and a client clipboard manager to be independently updated to support more copy and paste options or different copy and paste options without requiring any changes to the other components.

It should be noted that the hypervisor may not need to know that a client supports particular features or selections. Rather, the hypervisor may request the features supported by the guest agent and/or the features supported by the display protocol (e.g., SPICE, VNC, etc.). The client (e.g., rendering SPICE or VNC commands) may or may not support all the selections that the display protocol supports. That negotiation may happen separately between the display server and the display client (e.g., remote display system 132 and remote interface application 120 of FIG. 1), or may not happen at all (e.g., the identifier may be passed along to the client 108). If the remote display system 132 supports a particular selection, the hypervisor clipboard manager 130 may send the data for that selection to the remote display system 132 or may just send the data as is along with the identifier. In one embodiment, the remote display system 132 makes a decision whether or not to send the data on that clipboard selection depending on whether the remote interface application 120 supports it. Alternatively, the remote display system 132 does not make a decision but rather sends the data with the identifier of the clipboard selection to the client and the client clipboard agent 124 populates the appropriate clipboard selection. For example, the guest may send data for the PRIMARY selection to the hypervisor 104. The hypervisor remote display system 132 may pass it as is to the remote interface application 120 on the client 108. The remote interface application 120 will then, depending on what the client viewer actually supports, make a decision to send the data as the PRIMARY buffer or some other buffer supported on the client as well as the client viewer.

Figure 6:
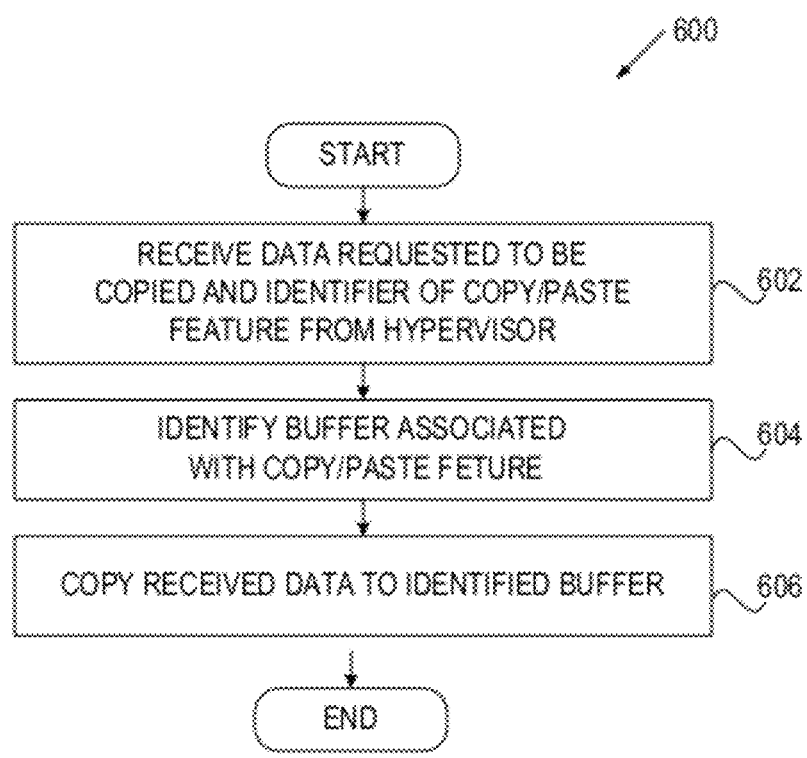
FIG. 6 is a flow diagram of one embodiment of a method for handling a paste operation by a guest.
Figure 7:
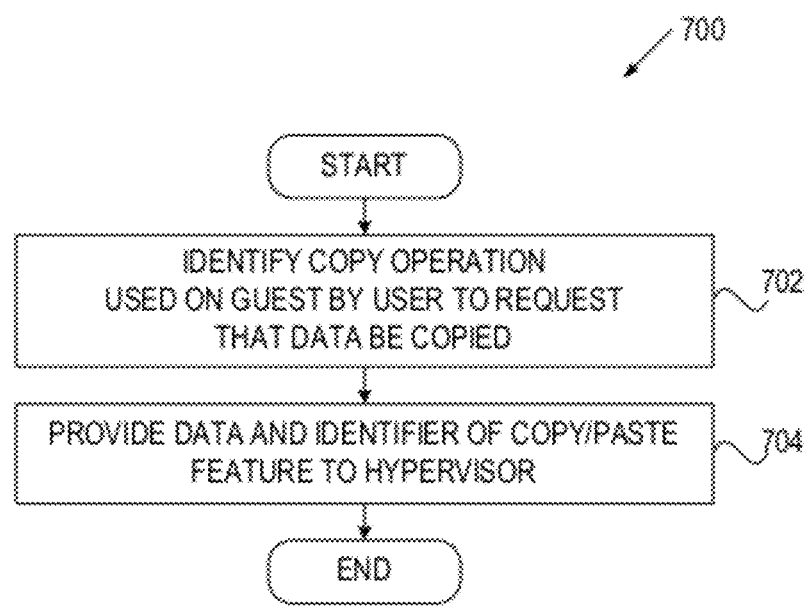
FIG. 7 is a flow diagram of one embodiment of a method for handling a copy operation by a guest.

FIGS. 6 and 7 illustrate embodiments of a method for handling copy and paste operations by a guest. The method may be performed by processing logic that may comprise hardware (circuitry, dedicated logic, etc.), software (such as is run on a general purpose computer system or a dedicated machine), or a combination of both. In certain embodiments, the method is performed by virtual machine 106 running on a host 102, as depicted in FIG. 1. The method may be performed by a guest clipboard agent (e.g., guest clipboard agent 114 of FIG. 1) that is part of a virtual machine.

Referring to FIG. 6, method 600 begins with the guest clipboard agent receiving data requested to be copied and an identifier of an associated copy and paste feature from a hypervisor (block 602). In one embodiment, the associated copy and paste feature is defined by a copy operation selected by the user on the client.

At block 604, the guest clipboard agent identifies a buffer that corresponds to the above copy and paste feature. At block 606, the guest clipboard agent saves the received data to the identified buffer or indicates to the X Server that it has new clipboard data for selected copy and paste feature.

Subsequently, the guest clipboard agent can detect a paste operation, identify a buffer corresponding to a relevant copy and paste feature, and paste the data from the identified buffer into a guest application. Alternatively, the guest application can query the X server for the corresponding copy and paste feature selection and receive the data from the guest clipboard agent that acts as the X client.

In another embodiment, the identifier of the copy and paste feature is not received from the hypervisor, and the data received by the guest is placed in a predefined buffer. Yet alternatively, if the guest supports more copy and paste features than the client, then the data can be saved to a matching buffer or to any (or all) of the buffers available, depending on a user preference or software defaults. When the user performs a paste operation, the data from a corresponding buffer is pasted into the guest application.

Referring to FIG. 7, method 700 begins with the guest clipboard agent detecting a copy operation on the guest (block 702). At block 704, the guest clipboard agent sends the data requested to be copied and the identifier of a corresponding copy and paste feature to the hypervisor.

In one embodiment, prior to sending the identifier of the copy and paste feature used by the user on the guest, the guest clipboard agent determines whether the hypervisor supports this feature. If so, the guest clipboard agent performs block 704. If not, the guest clipboard agent sends the data to be copied and an identifier of a default copy and paste feature supported by the hypervisor or does not send an identifier of a copy and paste feature at all.

Figure 8:
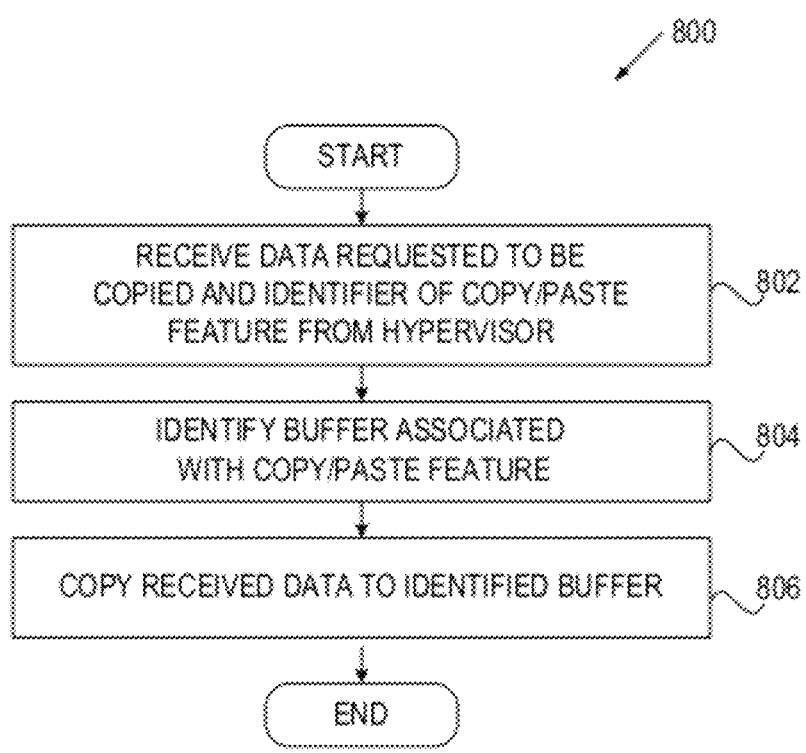
FIG. 8 is a flow diagram of one embodiment of a method for handling a paste operation by a client.
Figure 9:
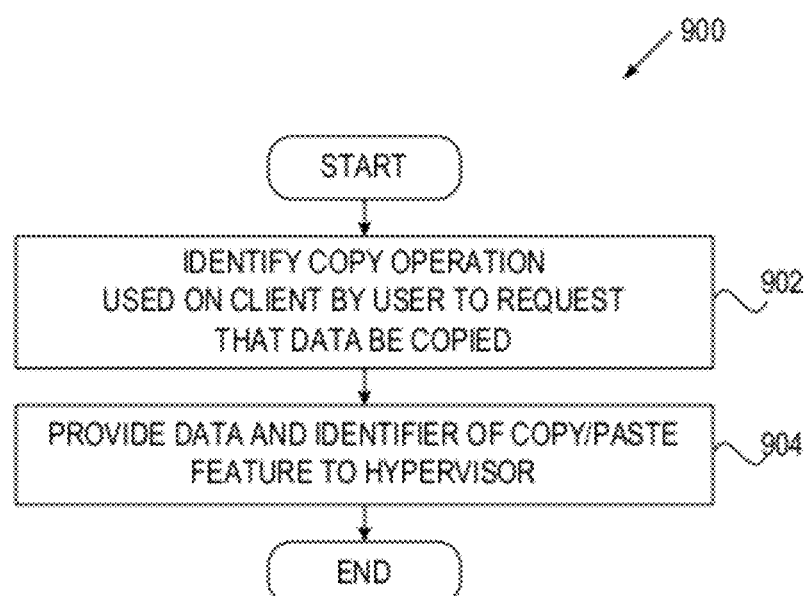
FIG. 9 is a flow diagram of one embodiment of a method for handling a copy operation by a client.

FIGS. 8 and 9 illustrate embodiments of a method for handling copy and paste operations by a client. The method may be performed by processing logic that may comprise hardware (circuitry, dedicated logic, etc.), software (such as is run on a general purpose computer system or a dedicated machine), or a combination of both. In certain embodiments, the method is performed by a client 108, as depicted in FIG. 1. The method may be performed by a client clipboard agent (e.g., client clipboard agent 124 of FIG. 1) of a client.

Referring to FIG. 8, method 800 begins with the client clipboard agent receiving data requested to be copied and an identifier of an associated copy and paste feature from a hypervisor (block 802). In one embodiment, the associated copy and paste feature is defined by a copy operation selected by the user on the guest.

At block 804, the client clipboard agent identifies a buffer that corresponds to the above copy and paste feature. At block 806, the client clipboard agent saves the received data to the identified buffer. Alternatively, the client clipboard agent indicates to the X Server that it has new clipboard data for the selected copy and paste feature.

Subsequently, the client clipboard agent detects a paste operation, identifies a buffer corresponding to a relevant copy and paste feature, and pastes the data from the identified buffer into a client application. Alternatively, the client application can query the X server for the corresponding copy and paste feature selection and receive the data from the client clipboard agent that acts as the X client.

In another embodiment, the identifier of the copy and paste feature is not received from the hypervisor, and the data received by the client is placed in a predefined buffer. For example, if the client only supports the clipboard feature, any data received by the client can be placed in the clipboard buffer. When the user performs a paste operation, the data from the clipboard buffer is pasted into a client application.

Yet alternatively, if the client supports more copy and paste features than the guest, then the data can be saved to a matching buffer or to any (or all) of the buffers available, depending on a user preference. When the user performs a paste operation, the data from a corresponding buffer is pasted into the client application.

Referring to FIG. 9, method 900 begins with the client clipboard agent detecting a copy operation on the client (block 902). At block 904, the client clipboard agent sends the data requested to be copied and the identifier of a corresponding copy and paste feature to the hypervisor.

In one embodiment, prior to sending the identifier of the copy and paste feature used by the user on the client, the client clipboard agent determines whether the hypervisor supports this feature. If so, the client clipboard agent performs block 904. If not, the client clipboard agent sends the data requested to be copied and an identifier of a default copy and paste feature supported by the hypervisor or does not send an identifier of a copy and paste feature at all.

Figure 10:
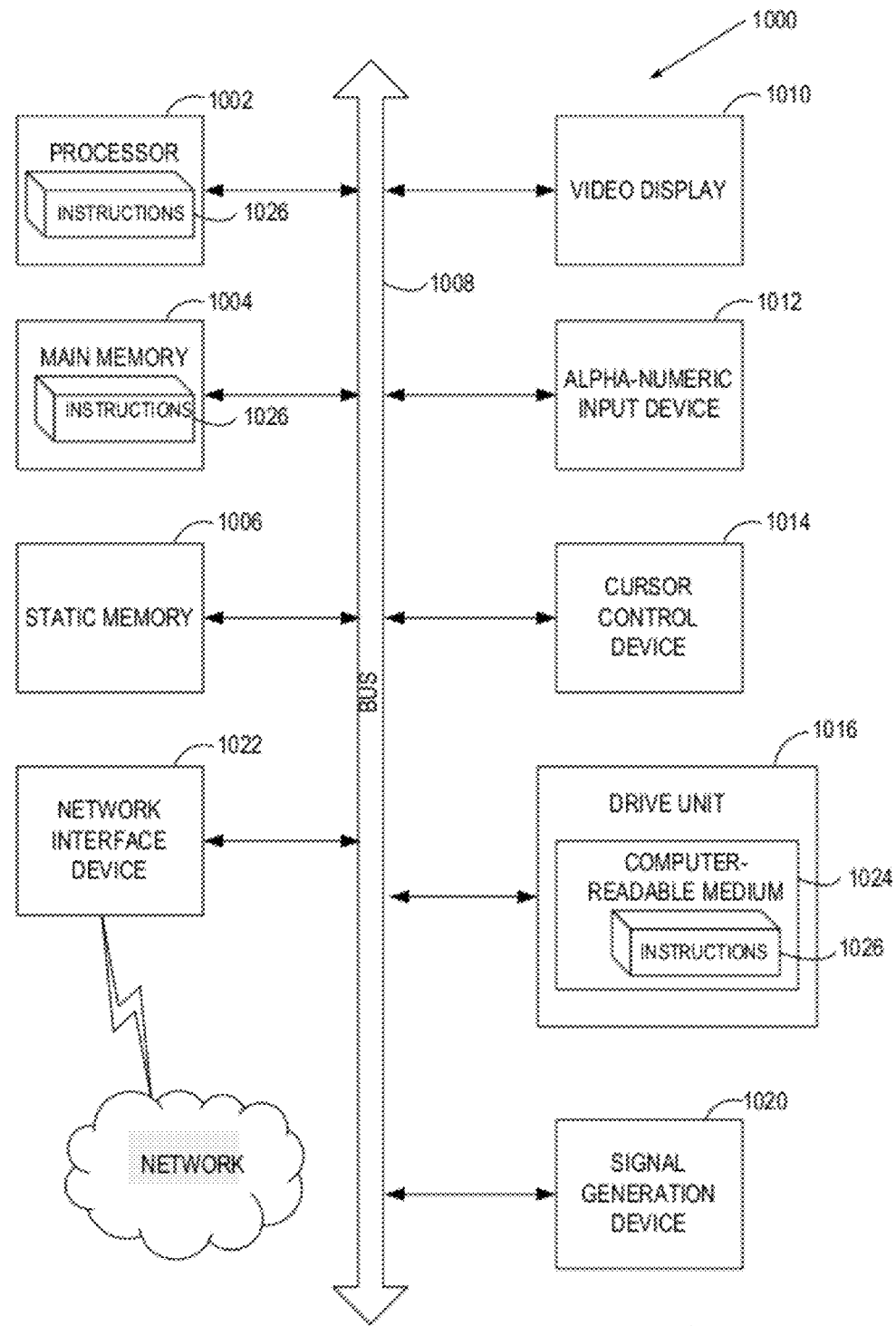
FIG. 10 illustrates a diagrammatic representation of a machine in the exemplary form of a computer system which may be used with an embodiment of the invention.

FIG. 10 illustrates a diagrammatic representation of a machine in the exemplary form of a computer system 1000 within which a set of instructions, for causing the machine to perform any one or more of the methodologies discussed herein, may be executed. In alternative embodiments, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 1000 includes a processing device 1002, a main memory 1004 (e.g., read-only memory (ROM), flash memory, dynamic random access memory (DRAM) such as synchronous DRAM (SDRAM) or Rambus DRAM (RDRAM), etc.), a static memory 1006 (e.g., flash memory, static random access memory (SRAM), etc.), and a drive unit 1016, which communicate with each other via a bus 1008.

Processing device 1002 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 1002 may also be one or more special-purpose processing devices such as an application specific integrated circuit (ASIC), a field programmable gate array (FPGA), a digital signal processor (DSP), network processor, or the like. The processing device 1002 is configured to execute instructions 1026 for performing the operations and steps discussed herein (e.g., instructions of clipboard manager 130, instructions of guest clipboard agent 114 and/or instructions of client clipboard agent 124).

The computer system 1000 may further include a network interface device 1022. The computer system 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse), and a signal generation device 1020 (e.g., a speaker).

The drive unit 1016 may include a machine-readable storage medium 1024 (also known as a computer-readable medium) on which is stored one or more sets of instructions or software 1026 embodying any one or more of the methodologies or functions described herein (e.g., instructions of clipboard manager 130, instructions of guest clipboard agent 114 and/or instructions of client clipboard agent 124). The software 1026 may also reside, completely or at least partially, within the main memory 1004 and/or within the processing device 1002 during execution thereof by the computer system 1000, the main memory 1004 and the processing device 1002 also constituting machine-readable storage media.

While the machine-readable storage medium 1024 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, and optical and magnetic media.

Thus, techniques for providing seamless copy-paste operations in a virtual machine environment have been described herein. Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "initiating" or "identifying" or "loading" or "determining" or "receiving" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

Embodiments of the present invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable medium.

In the foregoing specification, embodiments of the invention have been described with reference to specific exemplary embodiments thereof. It will be evident that various modifications may be made thereto without departing from the broader spirit and scope of embodiments of the invention as set forth in the following claims. The specification and drawings are, accordingly, to be regarded in an illustrative sense rather than a restrictive sense.

What is claimed is:

1. A method, comprising:
   receiving, by a hypervisor running on a host computer system, data selected on a client device for copying and an identifier of a copy operation of a plurality of copy operations supported by the client device, wherein the data was selected for copying using the copy operation, wherein the hypervisor manages a plurality of virtual machines running on the host computer system coupled to the client device via a network, and wherein each of the plurality of copy operations supported by the client device is associated with a distinct identifier that uniquely identifies a type of a respective copy operation on the client device; and
   transferring, by a processing device executing the hypervisor, the data and the identifier of the copy operation used on the client device to a virtual machine of the plurality of virtual machines to allow a user to paste the data in the virtual machine via a paste operation that corresponds to the identifier of the copy operation selected on the client device, wherein the corresponding paste operation is one of a plurality of copy and paste operations supported by the virtual machine, wherein each of the plurality of copy and paste operations supported by the virtual machine is associated with a distinct identifier that uniquely identifies a type of a respective copy and paste operation at the virtual machine, and wherein the identifier of the copy operation matches an identifier of the corresponding paste operation.

2. The computer-implemented method of claim 1, wherein:
   the plurality of copy operations supported by the client devices comprises a primary selection copy operation, a secondary selection copy operation and a clipboard selection copy operation; and
   each of the plurality of copy operations supported by the client device has a corresponding paste operation supported by the client device.

3. The computer-implemented method of claim 1, wherein at least a subset of the plurality of copy and paste operations supported by the virtual machine matches at least a subset of a plurality of copy and paste operations supported by the client.

4. The computer-implemented method of claim 1, further comprising:
receiving, by the hypervisor, content selected on the virtual machine for copying, wherein the content was selected for copying using a copy operation that is one of the plurality of copy and paste operations supported by the virtual machine, and the content is received with an identifier of the copy operation used on the virtual machine; and
transferring, by the hypervisor, the content and the identifier of the copy operation used on the virtual machine to the client device to allow the user to paste the content on the client device via a paste operation that corresponds to the copy operation used on the virtual machine.

5. The computer-implemented method of claim 1, further comprising:
establishing a communication channel between the hypervisor and the virtual machine, the communication channel to be used to transfer the copied data;
receiving identifiers of the plurality of copy and paste operations supported by the virtual machine; and
receiving identifiers of a plurality of copy and paste operations supported by the client device.

6. The computer-implemented method of claim 5, further comprising:
determining that the virtual machine does not support a paste operation matching the copy operation used on the client device; and
transferring the data and an identifier of a default paste operation supported by the virtual machine to the virtual machine.

7. A method, comprising:
receiving, by a processing device executing a virtual machine of a plurality of virtual machines hosted by a computer system, data selected on a client device for copying and an identifier of a copy operation used on the client device, wherein the computer system is coupled to the client device via a network, wherein the copy operation used on the client device is one of a plurality of copy operations supported by the client device, and wherein each of the plurality of copy operations supported by the client device is associated with a distinct identifier that uniquely identifies a type of a respective copy operation on the client device; and
allowing a user to paste the data on the virtual machine via a paste operation that corresponds to the copy operation used on the client device using the received identifier of the copy operation used on the client device, wherein the corresponding paste operation is one of a plurality of copy and paste operations supported by the virtual machine, wherein each of the plurality of copy and paste operations supported by the virtual machine is associated with a distinct identifier that uniquely identifies a type of a respective copy and paste operation at the virtual machine, and wherein the identifier of the copy operation matches an identifier of the corresponding paste operation.

8. The computer-implemented method of claim 7, further comprising:
identifying a copy operation used on the virtual machine to request that content be copied; and
transferring the content data and an identifier of the copy operation used on the virtual machine to a hypervisor running on the computer system to allow the content to be pasted on the client device via a paste operation corresponding to the copy operation used on the virtual machine.

9. The method of claim 7, further comprising:
providing identifiers of the plurality of copy and paste operations supported by the virtual machine; and
receiving identifiers of a plurality of copy and paste operations supported by the client device.

10. A method, comprising:
receiving, by a processing device of a client, data selected on a virtual machine for copying and an identifier of a copy operation of a plurality of copy and paste operations supported by the virtual machine, wherein the data was selected for copying using the copy operation, wherein the client is coupled to the virtual machine via a network, and wherein each of the plurality of copy and paste operations supported by the virtual machine is associated with a distinct identifier that uniquely identifies a type of a respective copy and paste operation at the virtual machine; and
allowing a user to paste the data on the client via a paste operation that corresponds to the identifier of the copy operation used on the virtual machine, wherein the corresponding paste operation is one of a plurality of copy and paste operations supported by the client, wherein each of the plurality of copy and paste operations supported by the client is associated with a distinct identifier that uniquely identifies a type of a respective paste operation on the client, and wherein the identifier of the copy operation matches an identifier of the corresponding paste operation.

11. The computer-implemented method of claim 10, further comprising:
identifying a copy operation used on the client to request that content be copied; and
transferring the content data and an identifier of the copy operation used on the client to a hypervisor running on the computer system to allow the content to be pasted on the virtual machine via a paste operation corresponding to the copy operation used on the client.

12. The method of claim 10, further comprising:
providing identifiers of the plurality of copy and paste operations supported by the virtual machine; and
receiving identifiers of the plurality of copy and paste operations supported by the client device.

13. A host system comprising:
a memory;
a processor; and
a hypervisor, executed from the memory by the processor, to:
receive data selected on a client device for copying and an identifier of a copy operation of a plurality of copy operations supported by the client device, wherein the data was selected for copying using the copy operation, wherein the hypervisor manages a plurality of virtual machines running on the host computer system coupled to the client device via a network, and wherein each of the plurality of copy operations supported by the client device is associated with a distinct identifier that uniquely identifies a type of a respective copy operation on the client device; and
transfer the data and the identifier of the copy operation used on the client device to a virtual machine of the plurality of virtual machines to allow a user to paste the data in the virtual machine via a paste operation that corresponds to the identifier of the copy operation selected on the client device, wherein the corresponding paste operation is one of a plurality of copy and paste operations supported by the virtual machine, wherein each of the plurality of copy and paste operations supported by the virtual machine is associated with a distinct identifier that uniquely identifies a type of a respective copy and paste operation at the virtual machine, and wherein the identifier of the copy operation matches an identifier of the corresponding paste operation.

14. The system of claim 13, wherein:

the plurality of copy operations supported by the client devices comprises a primary selection copy operation, a secondary selection copy operation and a clipboard selection copy operation; and each of the plurality of copy operations supported by the client device has a corresponding paste operation supported by the client device.

15. The system of claim 13, wherein at least a subset of the plurality of copy and paste operations supported by the virtual machine matches at least a subset of a plurality of copy and paste operations supported by the client.

16. The system of claim 13, wherein the hypervisor is further to:

receive content selected on the virtual machine for copying, wherein the content was selected for copying using a copy operation that is one of the plurality of copy and paste operations supported by the virtual machine, and the content is received with an identifier of the copy operation used on the virtual machine; and transfer the content and the identifier of the copy operation used on the virtual machine to the client device to allow the user to paste the content on the client device via a paste operation that corresponds to the copy operation used on the virtual machine.

17. The system of claim 13, wherein the hypervisor is further to:

establish a communication channel between the hypervisor and the virtual machine, the communication channel to be used to transfer the copied data;

receive identifiers of the plurality of copy and paste operations supported by the virtual machine; and receive identifiers of a plurality of copy and paste operations supported by the client device.

18. The system of claim 17, wherein the hypervisor is further to:

determine that the virtual machine does not support a paste operation matching the copy operation used on the client device; and transfer the data and an identifier of a default paste operation supported by the virtual machine to the virtual machine.

19. A non-transitory computer readable storage medium storing instructions which when executed cause a data processing system to perform a method comprising:

receiving, by a virtual machine of a plurality of virtual machines hosted by a computer system, data selected on a client device for copying and an identifier of a copy operation used on the client device, wherein the computer system is coupled to the client device via a network, wherein the copy operation used on the client device is one of a plurality of copy operations supported by the client device, and wherein each of the plurality of copy operations used on the client device is associated with a distinct identifier that uniquely identifies a type of a respective copy operation on the client device; and allowing a user to paste the data on the virtual machine via a paste operation that corresponds to the copy operation used on the client device using the received identifier of the copy operation used on the client device, wherein the corresponding paste operation is one of a plurality of copy and paste operations supported by the virtual machine, wherein each of the plurality of copy and paste operations supported by the virtual machine is associated with a distinct identifier that uniquely identifies a type of a respective copy and paste operation at the virtual machine, and wherein the identifier of the copy operation matches an identifier of the corresponding paste operation.

20. The non-transitory computer readable storage medium of claim 19, wherein the method further comprises:

identifying a copy operation used on the virtual machine to request that content be copied; and transferring the content data and an identifier of the copy operation used on the virtual machine to a hypervisor running on the computer system to allow the content to be pasted on the client device via a paste operation corresponding to the copy operation used on the virtual machine.

21. The non-transitory computer readable storage medium of claim 19, wherein the method further comprises:

providing identifiers of a plurality of copy and paste operations supported by the virtual machine; and receiving identifiers of a plurality of copy and paste operations supported by the client device.

* * * * *